March 31, 1964
G. G. FAYARD
3,127,506
MACHINE CONTROL
Original Filed Nov. 7, 1955
2 Sheets-Sheet 1
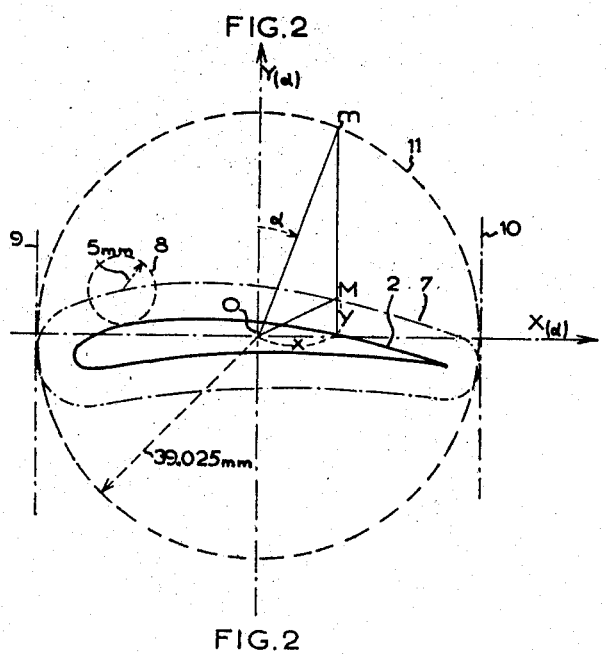
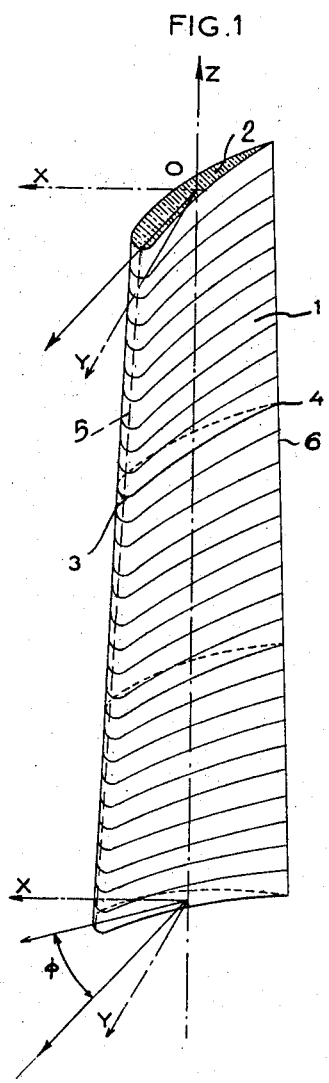
INVENTOR
GEORGES G. FAYARD
BY
Abraham A. Saffitz
ATTORNEY

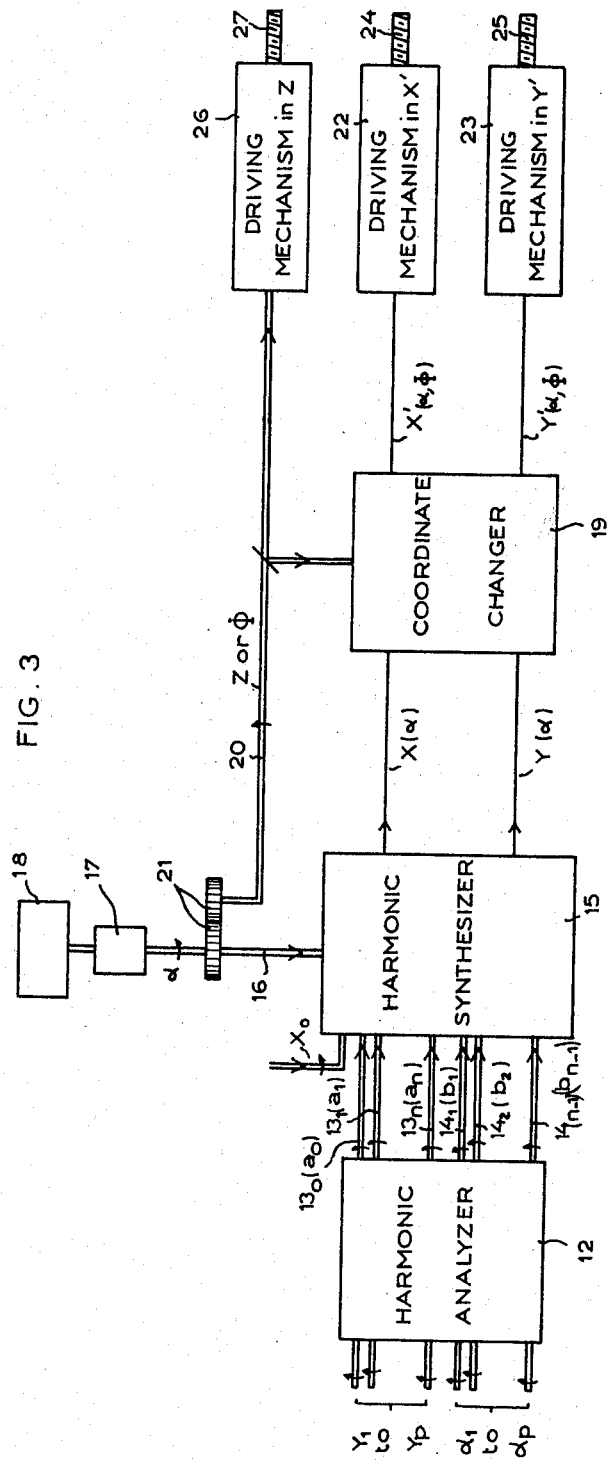

United States Patent Office 3,127,506
Patented Mar. 31, 1964

3,127,506
MACHINE CONTROL
Georges G. Fayard, Paris, France, assignor to Office National d'Etudes et de Recherches Aéronautiques, Chatillon-sous-Bagneux, France, a corporation of France
Original application Nov. 7, 1955, Ser. No. 545,397, now Patent No. 3,051,389, dated Aug. 28, 1962. Divided and this application Feb. 12, 1962, Ser. No. 172,466
1 Claim. (Cl. 235—152)

This application is a division of my copending application Ser. No. 545,397 filed Nov. 7, 1955 assigned to the same assignee as the present application and now Patent No. 3,051,389, issued August 28, 1962.

The present invention relates to automatically controlled machine-tools, for example machine-tools for the shaping of turbine blades.

The invention provides a machine-tool of this type which dispenses with memory devices for the shapes of patterns such as cams to be followed by a feeler or magnetic or perforated tapes which record a function of space for reproduction by the machine-tool. Instead the machine-tool requires only that the curve to be followed by the cutting tool be known in the form of a parametric equation, or alternatively that the coordinates of a finite number of points on the curve be known.

In general terms a turbine blade, or a compressor or propeller blade can be considered as being made up of a plurality of right cylinders having altitudes of any desired degree of smallness and slacked together. The shape and the dimensions of the right sections of these cylinders, hereinafter to be called "profiles," generally vary from one cylinder or cylindrical element of the blade to the next. The machine-tool of the invention is designed for the case where the shape and dimensions of the successive profiles of the right sections of the blades remain constant, being simply displaced angularly with respect to each other. Such blades will be called hereinafter "torsional blades."

The path followed by the cutter in milling a profile is a closed curve parallel to the profile and it will hereinafter be referred to as the "parallel curve."

This parallel curve or the profile itself can usually be defined in Cartesian parametric coordinates which can be developed in the form of a Fourier series limited to a certain number of terms. In the following it will be assumed that the curve the parametric coordinates of which are known is the parallel curve since how to perform the machining of a blade when only the parametric coordinates of the profile of the same is known is disclosed in my copending application Ser. No. 766,472 filed October 10, 1958 assigned to the same assignee as the present application and now Patent No. 3,051,386, issued August 28, 1962. A complete description of the parallel curve is obtained by causing the parameter to vary between zero and $2\pi$. If, instead of being defined by its parametric equations, the parallel curve is defined by $p$ points, the number of terms $2n$ (for example $(n+1)$ cosine terms including the constant term and $(n-1)$ sine terms) of the limited series must be equal to the number $p$ of points which are given for representation of the parallel curve in question. The derivation of the coefficients of the Fourier series from the coordinate values of the data points is made by harmonic analysis and the derivation of the parametric coordinates of the running point of the parallel curve from the Fourier series coefficients is made by harmonic synthesis.

Prior attempts have been made to control machine-tools by control units generating signals representative of the abscissa and the ordinate of a plane profile to be machined or of its parallel curve through Fourier analysis and synthesis. The parameter chosen has been, so far as I am aware, the polar angle of a point on the profile. This has the advantage of making it possible to drive by the same movement the pattern and workpiece support and the analyzer and synthesizer of the control unit. But practice has shown that, for hydrodynamic and aerodynamic profiles, the convergence of the Fourier series in terms of such a parameter is rather poor.

I have found that by a proper choice of the angular parameter in terms of which the Cartesian coordinates of the parallel curve are expressed, it is possible for a given limit of accuracy to obtain developments having good convergence and a small number of terms. The geometrical significance of the parameter chosen according to the invention will be given hereinafter. Though I do not desire that the invention as set forth in the appended claims depend upon such an explanation, I am of mind that the reduction of the number of the terms of the Fourier series of the coordinate developments obtained with the parameter I choose is due to the fact that two points respectively located on the extrados and the intrados of the profile at the same abscissa along the general extension of the same correspond to simply interrelated values of the parameter. Namely the two values of the parameter relative to said points are supplementary angles, while in the case where the parameter is the polar angle of the running point of the profile, there is not any simple relationship between these two values.

The machine for the shaping of torsional blades according to the invention comprises a harmonic synthesizer means developing, from a first rotative shaft the angular position of which represents an angular parameter and from the coefficients of a finite number of terms in a Fourier series representing the abscissa and ordinate of a curve as functions of said parameter, continuously varying abscissa and ordinate first values for said curve, a second rotative shaft the angular position of which represents an altitude coordinate, reductor means between said first and second shafts, and coordinate changer means adapted to derive, from said continuously varying abscissa and ordinate values and from said secoond shaft, second continuously varying values of the abscissa and the ordinate, respectively deduced from said first values by a rotation of the coordinate axes with respect to which the abscissa and ordinate values are taken, equal to the angular position of said second shaft.

The novel features characteristic of this invention are set forth with particularity in the appended claims. The invention itself however, both as to its organization and its method of operation together with additional objects and advantages thereof, will best be understood from the following description when read in connection with the accompanying drawings in which:

FIG. 1 represents a turbine torsional blade;

FIG. 2 is a diagram of the right section or profile of a turbine blade showing in conjunction therewith the curve parallel to this profile traced out by the axis of the cutting tool, indicating the geometrical significance of the angular parameter as a function of which the parallel curve coordinates are developed; and FIG. 3 is a block diagram of the apparatus of the invention.

Referring to FIG. 1, 1 represents a so-called torsional blade which has a cross-section constant 2 in shape and dimensions but the leading edge 3 and trailing edge 4 thereof describe circular helices along the axis OZ, respectively 5 and 6. The invention makes it possible to machine a blade or similar workpiece the constant profile of which rotates proportionally with the position of the profile along the longitudinal axis of the blade. In FIG. 1, the rotation of the profile betwen two sectional planes is identified as Φ.

FIG. 2 illustrates at reference character 2 the right section of a blade, said section being a Joukowski's profile, and at reference character 7 the curve parallel to said profile traced out by the axis of a rotating cutter 8. This cutter may for purposes of a concrete example only be assumed to have a diameter of 5 mm.

Let $X_0$ be the half distance between two tangents 9 and 10 to the parallel curve 7, these tangents being parallel to each other and containing between them the complete parallel curve 7 as indicated in FIG. 2. The angle $\alpha$ then represents in FIG. 2 the polar angle of a point $m$ on the circle 11 tangent to the two parallel tangents just mentioned, the center O of this circle being at the origin of coordinates. The point $m$ has the same abscissa as the running point M on the parallel curve and consequently the abscissa of point M is a sine function of $\alpha$:

$$X = X_0 \sin \alpha$$

(in FIG. 2, $X_0 = 39.025$ mms.), i.e. a Fourier series limited to its fundamental term.

The ordinate is a Fourier series which practically can be limited to a constant term, six cosine terms and five sine terms, i.e. a Fourier series developed up to the sixth order.

$$Y = -20.26 \quad +86.16 \cos \alpha \quad -0.34 \sin \alpha$$
$$+18.44 \cos 2\alpha \quad -9.13 \sin 2\alpha$$
$$-12.58 \cos 3\alpha \quad +0.90 \sin 3\alpha$$
$$+2.50 \cos 4\alpha \quad -2.69 \sin 4\alpha$$
$$+3.81 \cos 5\alpha \quad +0.47 \sin 5\alpha$$
$$-1.24 \cos 6\alpha$$

More generally it is possible to write:

$$X(\alpha) = X_0 \sin \alpha$$
$$Y(\alpha) = \sum_{j=0}^{n} a_j \cos j\alpha + \sum_{j=1}^{n-1} b_j \sin j\alpha$$

The parallel curve is defined by the knowledge of $X_0$ and $a_j$ and $b_j$. The continuously varying abscissa $X(\alpha)$ is produced by a sine potentiometer driven in $\alpha$ and the continuously varying ordinate $Y(\alpha)$ is produced by a harmonic synthesizer. Harmonic synthesizers are known in the art and are described for example in the article "Harmonic Analyzer and Synthesizer" by Jules Lehman, Electronics, Novemebr 1949, pages 106-110 and in the article "A One-Dimensional Fourier Analog Computer" by Leonid V. Azaroff, The Review of Scientific Instruments, May 1954, pages 471-477. These synthesizers essentially comprise sinusoidal multiplying potentiometers or synchro-transformers. The parameter values in the terms to be added are arranged in arithmetic progression and can be simultaneously materialized by means of shafts coupled, through gearing means having ratios arranged in arithmetic progression, to a common basic shaft whose rotation represents the variation of the parameter itself, each of said shaft driving a sine multiplying potentiometer or synchro-transformer. The sine potentiometers are respectively fed by D.C. voltages proportional to the terms of the Fourier series and the synchro-transformers by A.C. voltages proportional to said terms. The output voltages of the sine potentiometers or synchro-transformers are added by being applied to a common output resistor.

Instead for the parallel curve of being defined by the coefficients of a limited Fourier series, it may be defined by input data for the coordinates of $p$ points ($p=2n$). A harmonic analyzer solves the following equations:

$$Y_1 = a_0 + a_1 \cos \alpha_1 + \ldots + a_n \cos n\alpha_1$$
$$+ b_1 \sin \alpha_1 + \ldots + b_{n-1} \sin (n-1)\alpha_1$$
$$Y_j = a_0 + a_1 \cos \alpha_j + \ldots + a_n \cos n\alpha_j$$
$$+ b_1 \sin \alpha_j + \ldots + b_{n-1} \sin (n-1)\alpha_j$$
$$Y_p = a_0 + a_1 \cos \alpha_p + \ldots + a_n \cos n\alpha_p$$
$$+ b_1 \sin \alpha_p + \ldots + b_{n-1} \sin (n-1)\alpha_p$$

in which $Y_1$, $Y_j$ and $Y_p$ are the values of the ordinates of known points on the desired parallel curve corresponding to values $\alpha_1$, $\alpha_j$ and $\alpha_p$ of the parameter. The $2n$ unknowns are the coefficients $a_0$ to $a_n$ and $b_1$ to $b_{n-1}$. When the angular intervals between the parameter values of the known parallel curve points are equal or in other words when the known points correspond to equally spaced values of the angular parameter, the coefficients are given by the relations:

$$a_i = \frac{2}{p} \sum_{j=1}^{p} Y_j \cos i\alpha_j$$

$$b_i = \frac{2}{p} \sum_{j=1}^{p} Y_j \sin i\alpha_j$$

$$a_0 = \frac{1}{p} \sum_{j=1}^{p} Y_j$$

Since as a result of the equal spacing of the parameter values $\alpha_j = j\alpha_1$, the preceding relations assume the form:

$$a_i = \frac{2}{p} \sum_{j=1}^{p} Y_j \cos j(i\alpha_1)$$

$$b_i = \frac{2}{p} \sum_{j=1}^{p} Y_j \sin j(i\alpha_1)$$

$$a_0 = \frac{1}{p} \sum_{j=1}^{p} Y_j$$

Harmonic analyzers are described in the former references cited about harmonic synthesizers.

Referring to FIG. 3, the apparatus comprises a harmonic analyzer 12 which from data constituted by ordinates of sample points on the parallel curve and by the parameter values corresponding to these ordinates develops the values of the coefficients in a limited Fourier development of the ordinate, these coefficients $a_0$ to $a_n$ and $b_n$ to $b_{n-1}$ taking for example the form of rotations of shafts $13_0$ to $13_n$ and $14_0$ to $14_n$.

The rotations of these shafts thus constitute input data to the harmonic synthesizer 15, which receives as supplementary input data a variable angle $\alpha$ in the form of a rotation of the shaft 16 representing the output of a speed reducer 17 driven by a motor 18. The synthesizer also receives as input data the quantity $X_0$, again in the form of a shaft rotation.

Synthesizer 15 develops the values of X and Y as functions of $\alpha$ in the form of voltages. These voltages are applied to a coordinate changer 19 which receives in addition via shaft 20 an angular rotation $\Phi$ proportional to the angular rotation $\alpha$ which serves to control the rotation of the parallel curve to the profile as a function of the altitude Z of the latter. Shaft 20 is driven from shaft 16 via gearing 21.

The coordinate changer delivers values $X'$ and $Y'$ of the abscissa and ordinate of a current point along the parallel curve which are related to abscissa and ordinate values X and Y by the formula of rotation of the coordinates axes, i.e.

$$X' = X \cos \Phi + Y \sin \Phi$$
$$Y' = X \sin \Phi - Y \cos \Phi$$

Coordinate changers are well known in the analog computation art. They comprise a first sine potentiometer fed by a voltage proportional to X, a second sine potentiometer fed by a voltage proportional to Y, these potentiometers each having two rectangular arms, a sine arm and a cosine arm, which are driven by shaft 20. The output voltages of the cosine arm of the first potentiometer and the sine arm of the second potentiometer are added in a first adding resistor and the output voltages of the sine arm of the first potentiometer and the cosine arm of the second potentiometer (after being reversed in polarity) are added in a second adding resistor.

The voltages $X'(\alpha, \Phi)$, $Y'(\alpha, \Phi)$ are applied respectively to abscissa and ordinate servomechanisms 22 and 23 which control screws 24 and 25 for positioning the cutting tool with respect to the workpiece in orthogonal directions of a horizontal plane. Shaft 20 controls a similar mechanism 26 for the Z direction (servomechanism 26 is controlled by a shaft instead of a voltage) whose screw 27 adjusts the relative position of cutter and workpiece vertically. Servomechanisms are represented in the form of block diagram in FIG. 3; they are more fully described in FIG. 6 of my copending application Ser. No. 545,397, above referred to.

What I claim is:

A cutting machine for the shaping of torsional blades having a general shape produced by a constant plane profile displaced and simultaneously rotated along an altitude coordinate axis, said profile being defined by limited Fourier series representing its abscissa and ordinate with respect to fixed coordinate axes and in function of an angular parameter the coefficients of which are given, comprising a harmonic synthesizer means developing from a first rotative shaft the angular position of which represents the said angular parameter and from said given coefficients continuously varying abscissa and ordinate representative first signals, a second rotative shaft the angular position of which represents the altitude coordinate, reductor means between said first and second shafts, coordinate changer means driven by said second shaft, adapted to derive from said continuously varying abscissa and ordinate representative first signal and from said second shaft continuously varying abscissa and ordinate representative second signal respectively equal to said continuously varying abscissa and ordinate representative first signal transformed by a rotation of the coordinate axes through an angle equal to the angular position of said second shaft, a first servomechanism controlling the abscissa of the cutter of said machine and driven by said continuously varying abscissa representative second signal, a second servomechanism controlling the ordinate of the cutter and driven by said continuously varying ordinate representative second signal and a third servomechanism controlling the altitude of the cutter and driven by said second shaft.

No references cited.